United States Patent [19]

Curry et al.

[11] Patent Number: 5,479,016
[45] Date of Patent: Dec. 26, 1995

[54] COMPACT SECOND GENERATION FLIR KIT

[75] Inventors: John J. Curry; Robert C. Guckian; John M. Hall, all of Alexandria; Hendrik K. Sijgers, Reston, all of Va.

[73] Assignee: The United States of America as represented by the Secretary of the Army, Washington, D.C.

[21] Appl. No.: 267,743

[22] Filed: Aug. 25, 1994

[51] Int. Cl.[6] .................................. G01J 5/02; G01J 5/08
[52] U.S. Cl. ........................... 250/334; 250/353; 250/332
[58] Field of Search ...................................... 250/332, 334, 250/349, 352, 353

[56] References Cited

U.S. PATENT DOCUMENTS

| | | | |
|---|---|---|---|
| 4,280,050 | 7/1981 | Callender et al. | 250/334 X |
| 4,542,986 | 9/1985 | Berdanier | 250/334 X |
| 4,806,761 | 2/1989 | Carson et al. | 250/332 |
| 4,983,837 | 1/1991 | Cooper et al. | 250/353 X |
| 5,136,421 | 8/1992 | Sagan | 250/332 X |
| 5,264,930 | 11/1993 | Florence | 250/332 X |

*Primary Examiner*—Carolyn E. Fields
*Assistant Examiner*—Edward J. Glick
*Attorney, Agent, or Firm*—Milton W. Lee; John E. Holford; Anthony T. Lane

[57] ABSTRACT

A GEN II FLIR kit having two assemblies mounted on a common platform, the first comprising a dewar, integral cooler, and imaging optics with scanner folded into a compact unit and the second assembly comprising a set of afocal optics with wide and narrow fields of view.

13 Claims, 8 Drawing Sheets

COMPACT SECOND GENERATION FLIR KIT

BACKGROUND OF THE INVENTION

1. Field of the Invention

The present invention generally relates to a Forward Looking Infrared imaging system (FLIR). More Particularly it involves a space saving set of optical elements that are flexible in form and function.

2. Description of Prior Art

In the patent entitled "UNIVERSAL VIEWER FOR FAR INFRARED", to Patrick J. Daly, issued 18 Sep. 1973, there is described a modular FLIR which the Army now refers to as a First Generation or GEN I FLIR. A Second Generation or GEN II FLIR has now been proposed in which the field units are kits rather than modules. Modules are used in the kits, but are no longer required to have common interfaces as long as the external interfaces of the kit remains unchanged. To test operate each kit requires only a standard power supply, control panel, and display as found in an Army vehicle, and there will be a such a vehicle or other system for every type of kit. Ground vehicles such as tanks and weapons carriers have limited spaces originally designed for GEN I FLIR's, which are now used to house GEN II FLIR's. Since the scanning systems now available for GEN II systems have larger apertures and provide greater resolutions, it follows that the optical elements such as lenses and reflectors will be larger also. There is thus a problem presented in how to fit the GEN II kits into the same spaces which hold Gen I modular systems.

SUMMARY OF THE INVENTION

According to the invention, a compact GEN II FLIR kit is provided by using a close-coupled axially folded set of optical lenses that adapt to various off,axis mounting platforms associated with the head mirrors mounted in most vehicles. These mirrors raise and extend the field of view while isolating the sensor from missiles directed toward the vehicle.

One object of the invention is to provide an afocal and imaging lens system to match the high resolution detector used in GEN II FLIR's.

A further object of the invention is to provide the above lens systems in a compact folded arrangement that is applicable to all existing ground vehicles used by the Army and some civilian agencies as well.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
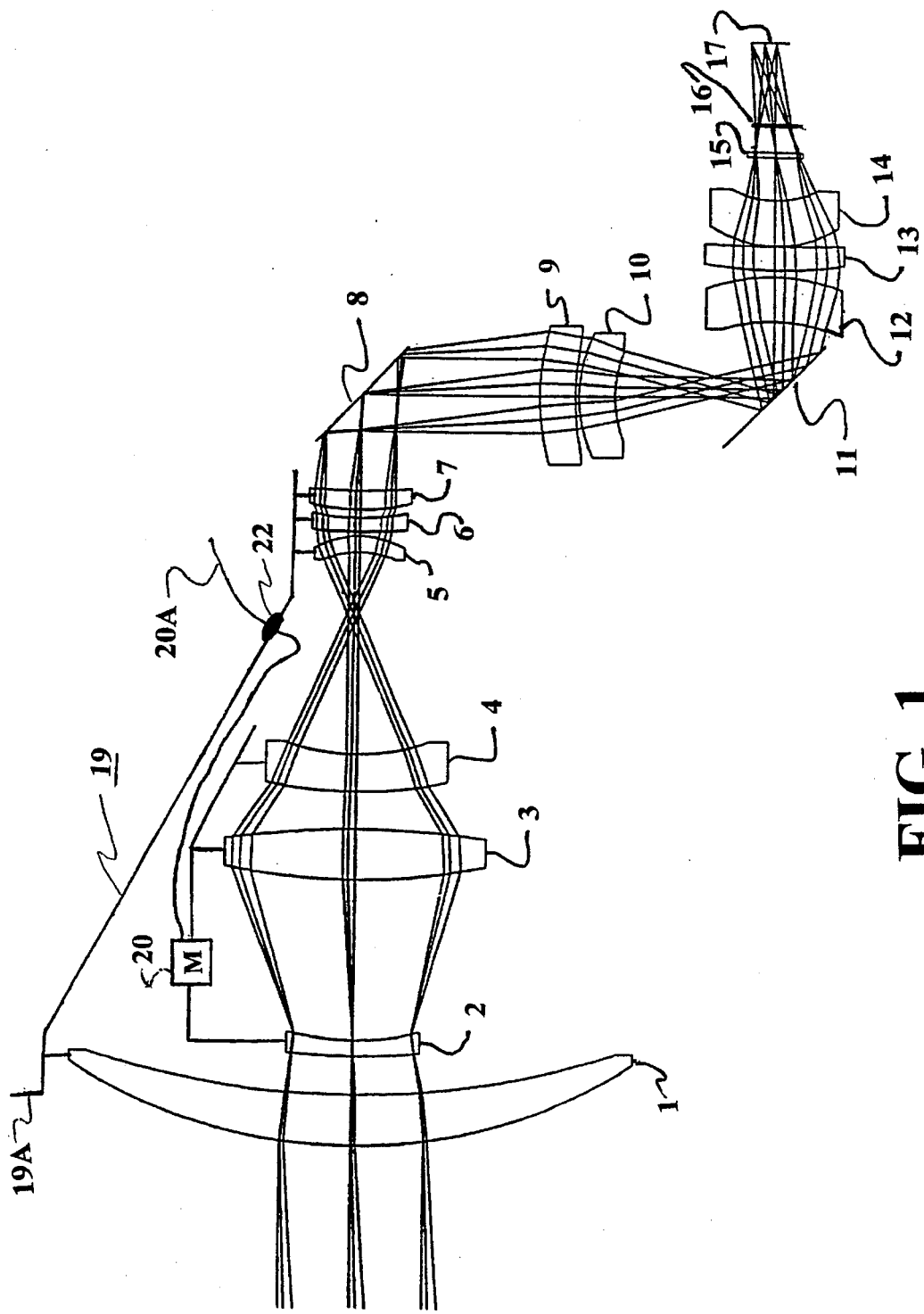
FIG. 1 shows a side view of the infrared lens assembly including fixed lenses, reflecting mirrors, removable wide field of view lenses and planar window elements of the above kit in proper sequence along the optical axis.

Referring now to the drawings, and more particularly to FIG. 1, there is shown an optical schematic view of a compact GEN II FLIR Kit. This kit includes a complete assembly of infrared transparent or reflecting elements 1 through 16. The complete specification of these elements and critical spacings therebetween, if required, is given in Table I. Elements 15 and 16 are plane windows that are included in the opposed walls of a supercooled vacuum insulated detector-dewar assembly 18 shown in FIG. 2, one version of which is described in patent application Ser. No. 08/176,866 entitled "Interface Design and Technique for Detector-Cooler Assembly", filed 30 Dec. 1993, by Neil D. Supula, et al. The lens compositions are defined generally as Ge or ZnSe, however, as is well known the art, these lenses are specially formulated and

TABLE I

| LENS DATA NV-80 wide/FOV | | | | | | |
|---|---|---|---|---|---|---|
| Element | Radius of Curvature | | Axial Dist. to | Aperture Diameter | | Lens |
| No. | Front | Back | Next Surf. | Front | Back | Glass |
| Object | Infinite | | Infinite | 1.6207 | | |
| | | | 0.5000 | | | |
| 01 | A(1) | 8.6157 cc | 0.5130 | 5.5000 | 5.3500 | Ge |
| | | | 0.3877 | | | |
| 02 | 5.7326 cx | A(2) | 0.1613 | 1.2603 | 1.2143 | Ge |
| | | | 1.6056 | | | |
| 03 | A(3) | −9.6468 cx | 0.5000 | 2.5204 | 2.4964 | Ge |
| | | | 0.3676 | | | |
| 04 | 4.1874 cx | 2.1618 cc | 0.3800 | 1.7326 | 1.4123 | ZnSe |
| | | | 0.6473 | | | |

TABLE I-continued

| | | LENS DATA NV-80 wide/FOV | | | | |
|---|---|---|---|---|---|---|
| 05 | −1.0410 cc | −0.9629 cx | 0.1650 0.0440 | 0.7411 | 0.8484 | Ge |
| 06 | 5.7453 cx | 2.2900 ce | 0.1300 0.0838 | 0.8945 | 0.8986 | ZnSe |
| 07 | 2.1801 cx | 6.1181 cc | 0.1800 0.9484 | 0.9624 | 0.9360 | Ge |
| | | Decenter (1) | | | | |
| 08 | | Infinite | −1.6711 −0.1601 | 1.2389 1.2013 | | Reflr. |
| 09 | −2.3987 cx | −2.9705 cc | −0.3632 −0.0349 | 1.2659 | 1.1511 | Ge |
| 10 | −1.3495 cx | A(4) | −0.3619- 1.5748 | 1.1315 | 0.8960 | Ge |
| | | Decenter (2) | | | | |
| 11 | | Infinite | 0.7361 | 1.3079 | | Reflr. |
| 12 | A(5) | −1.9092 cx | 0.4381 0.0651 | 1.0231 | 1.2492 | Ge |
| 13 | 4.2042 cx | 12.5128 cc | 0.2366 0.0063 | 1.2866 | 1.2481 | Ge |
| 14 | 1.1520 cx | A(6) | 0.4469 0.3533 | 1.1769 0.5527 0.0626 | 0.7999 | Ge |
| 15 | Infinite | Infinite | 0.0501 0.0463 | 0.4928 | 0.4820 | Ge |
| | Aperture Stop | | 0.1609 0.0394 | 0.3912 0.3975 | | |
| 16 | | Infinite | 0.0250 0.7880 | 0.4023 0.5119 | 0.4031 | Ge |
| 17 | | | 0.0000 | 0.5119 | | |
| | IMAGE DISTANCE = | | 0.0000 | 0.5119 | | |
| IMAGE | | Infinite | | | | |

NOTES
- Positive radius indicates the center of curvature is to the right.
- Negative radius indicates the center of curvature is to the left.
- Thickness is axial distance to next surface.
- Image diameter shown above is a paraxial value, not a traced ray value.
- ASPHERIC CONSTANTS $$Z = \frac{(CURV)Y^2}{1 + (1 - (1 + K)(CURV)^2 Y^2)^{0.5}} + (A)Y^4 + (B)Y^6 + (C)Y^8 + (D)Y^{10}$$

| ASPHERIC | CURV | K | A | B | C | D |
|---|---|---|---|---|---|---|
| A(1) | 0.17882914 | 0.802508 | 0.00000E+00 | 0.00000E+00 | 0.00000E+00 | 0.00000E+00 |
| A(2) | 0.38065618 | 0.000000 | 2.95011E−02 | −4.43674E−02 | 1.09908E−01 | −9.32973E−02 |
| A(3) | 0.17391266 | 0.000000 | −6.36923E−03 | −5.56056E−04 | 4.30905E−04 | −8.72386E−05 |
| A(4) | 0.81063040 | 0.000000 | −2.27761E−02 | −5.74201E−03 | −1.63065E−02 | 0.00000E+00 |
| A(5) | 0.54363022 | 0.000000 | 0.00000E+00 | −3.64392E−03 | 0.00000E+00 | 0.00000E+00 |
| A(6) | 1.11586536 | 0.000000 | 1.32136E−02 | 7.54790E−03 | 0.00000E+00 | 0.00000E+00 |

| | | DECENTERING CONSTANTS | | | | |
|---|---|---|---|---|---|---|
| DECENTER | X | Y | Z | ALPHA | BETA | GAMMA |
| D(1) | 0.0000 | 0.0000 | 0.0000 | 45.0000 | 0.0000 | 0.0000 | (BEND) |
| D(2) | 0.0000 | 0.0000 | 0.0000 | −45.0000 | 0.0000 | 0.0000 | (BEND) |

DECENTER NOTE - A decenter defines a new coordinate system (displaced and/or rotated) in which subsequent surfaces are defined. Surfaces following a decenter are aligned on the local mechanicer axb (z-axis) of the new coordinate system. The new mechanical axis remains in use until changed by another decenter. The order in which displacements and tilts are applied on a given surface is specified using different decenter types and these generate new coordinate systems; those used here are explained below. Alpha, beta, and gamma are in degrees.
DECENTERING CONSTANT KEY:
TYPE                          TRAILING CODE           ORDER OF APPLICATION DECENTER                                              DISPLACE (X,Y,Z)
                                                      TILT (ALPHA,BETA,GAMMA)

TABLE I-continued

LENS DATA NV-80 wide/FOV

| DECENTER AND BEND | BEND | REFRACT AT SURFACE<br>THICKNESS TO NEXT SURFACE<br>DECENTER (X,Y,Z,ALPHA,BETA,GAMMA)<br>REFLECT AT SURFACE<br>BEND (ALPHA,BETA,GAMMA)<br>THICKNESS TO NEXT SURFACE |
|---|---|---|

REFERENCE WAVELENGTH = 10000.0 NM
SPECTRAL REGION = 8000.0–10000.0 NM
This is a decentered system. If elements with power are decentered or tifted, the first order properties are probably inadequate in describing the system characteristics.

INFINITE CONJUGATES

| | |
|---|---|
| EFL = | 3.6664 |
| BFL = | –0.0358 |
| FFL = | –13.2890 |
| F/NO = | 2.4993 |
| IMAGE DIST = | 0.0000 |
| OAL = | 7.2502 |
| PARAXIAL IMAGE HT = | 0.2400 |
| SEMI-FIELD ANGLE = | 3.7450 |
| ENTR PUPIL DIAMETER = | 1.4670 |
| DISTANCE = | 0.7320 |
| EXIT PUPIL DIAMETER = | 0.383 |
| DISTANCE = | 0.9945 |

CONJUGATE NOTES
- FFL is measured from the Hot surface.
- BFL is measured from the last surface.

provided with non-reflective coatings, one Ge type being known commercially as GERMLW. The first seven of these elements are mounted in a thin walled afocal housing 19. The inside input end diameter of this housing is sufficient to accommodate objective lens 1 which has a useful aperture of 5.5 inches. From a smaller circumferential inflection locus spaced from this end the housing tapers to a diameter which accommodates lens element 4 with an aperture of just under 1.75 inches and shortly thereafter tapers only slightly to an approximate one inch exit aperture and to accommodate lenses 5–7 that have apertures under one inch in diameter. Lens elements 2, 3 and 4 are mounted in the wide tapered portion on a motorized mounting 20 that swings lenses 2 and 3 into alignment with or away from the optical axis in response to a first electrical signal. The same mounting can also move them parallel to the optical axis for focussing in response to a second, third or fourth signal. The housing wall contains an aperture with a seal or grommet 22 for a control cable 20A which carries leads for the motorized mountings and a ground for the housing in the usual manner. The large end of the busing may have the edge turned to form a narrow circumferential flange 19a to engage a support structure or mounting adapter as will be discussed later. The flange also may have equally spaced and/or threaded mounting holes. The housing may also have a window or a receptacle to accommodate the wide angle lenses 1–4, collimating lenses 5–7, in their off-axis mode.

Figure 2:
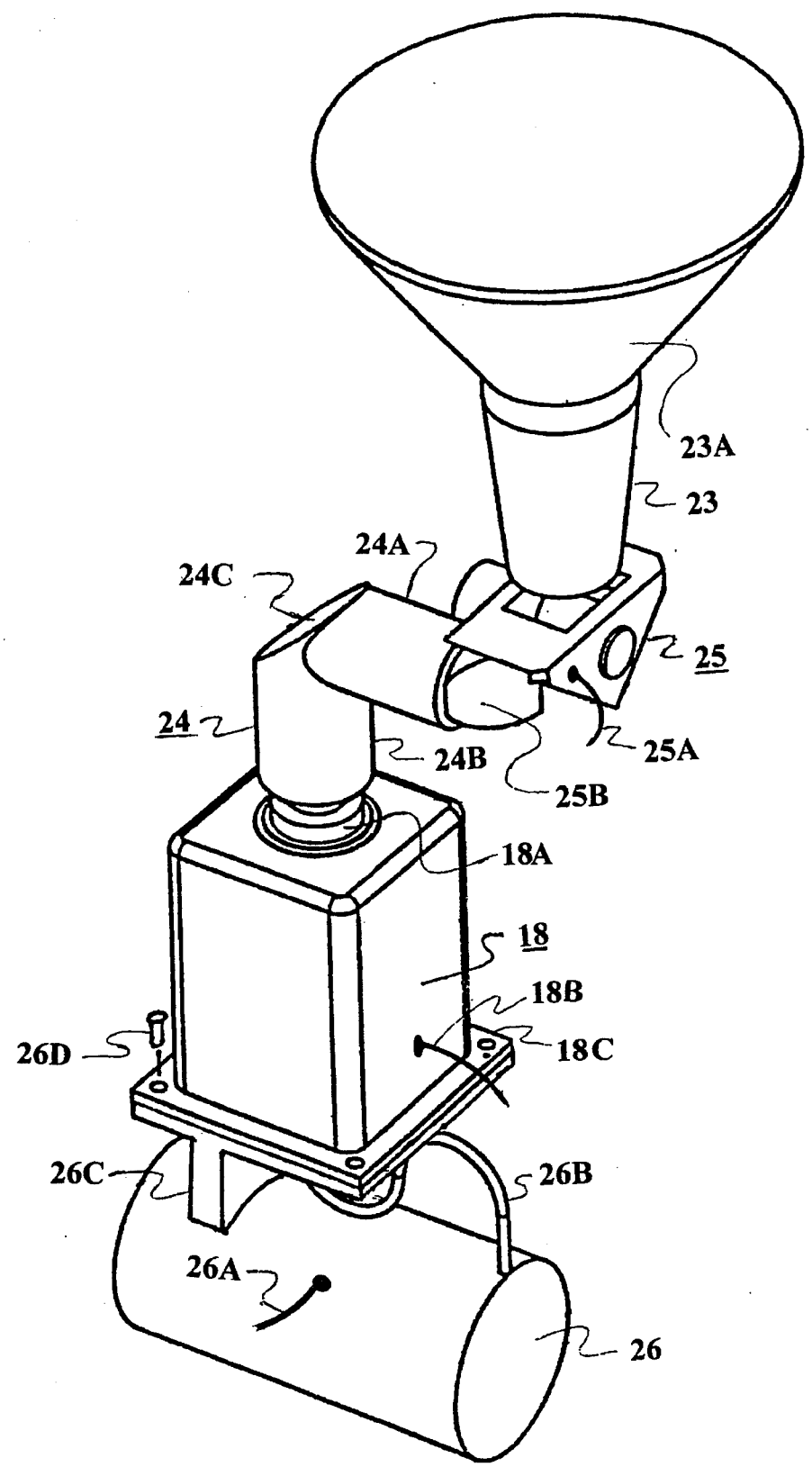
FIG. 2 shows an isometric view of a GEN II Kit according to the present invention.

As shown in FIG. 2 the afocal lenses and housing comprise a module 23 and the remaining reflectors and lens elements 8–14 are housed in a tubular right angle elbow housing 24 having a pair of straight arms of uniform circular cross-section the axes of which coincide with the optical axis and which axes intersect to define a common point. The elbow housing further includes a flat wall 24C with a reflecting surface including the common point. The walls of the arms intersect at the corner to form a combined arm structure. As is well understood in the optical art, the flat wall 24c must be perpendicular to the common plane of the arm axes and a normal to the wall in the common plane must bisect the angle between the arm axes. For a 90° corner this produces 45° angles, but this is not critical in the present invention. The resulting corner may be a complex structure defined by the intersection of the walls on the combined arm and the flat wall or some simpler structure. The arms have an inner diameter to accommodate lenses with a little more than a 1¼ inch diameter aperture. The input end of this housing is adapted to receive a plug-in motorized scanning mirror module 25 that includes at least one mirror element 8. Mating threads, grooves, detent holes and the like can be provided in elbow housing and the scanning module for this purpose. A scanning motor is included in the scanner housing with an external power lead 25A sealed through the scanner housing wall. Decollimating lenses 9 and 10 are mounted in the input arm 24A of the housing and imaging lenses 12, 13 and 14 are mounted in the output arm 24B. The fixed reflector element 11 is mounted on the inside surface of the wall 24C and steers the image beam from the input arm into the output arm. This places the optical axis of the output arm parallel to that axis in the afocal housing but spaced therefrom by the length of that axis in the input arm.

Each lens provides a critical function in the operation of the FLIR. The objective lens 1 gathers a large sample of radiation from the distant object. Relay lens 4 focusses this light to fit the smaller aperture of the subsequent lenses and corrects for frequency aberration by the objective, owing to its different dielectric constant. Lens 4 Also provides a quality focus for inserting planar thermal reference devices or protective devices for the sensitive detector elements used in FLIR's. Lenses 2 and 3 increase the field of view, the use of two lenses permits an increase in light gathering power while maintaining the required exit aperture. The three collimating lenses 5, 6, and 7 prepare the beam for substantially undistorted reflection by the scanning mirror 8. Again the combination of germanium and zinc-selenide lenses compensates for the frequency aberration of either type used alone. The collimated image beam at the scanner 25 allows the image to be shifted normal to the optical axis without any other distortion. It also compensates for variations in spacing between the afocal and scanner housings. The same is true for the spacing between the housings of the scanner and decollimating lenses 9 and 10. This spacing can thus be chosen to meet mounting space geometry in the vehicle to which the FLIR is assigned by using a housing 24 with the required length of input arm 24A. The use of two decollimating lenses reduces spherical aberration and provides an intermediate focus such that the dewar aperture can be the optical stop for the whole system. In the final imaging lenses, the use of three lenses with differing dielectric constants provides an image well corrected for spherical and frequency aberration. The judicious use of aspherical lens surfaces increases the useable areas of those lenses reducing the required size and weight of the overall optics and the amount of special germanium or zinc-selenide material required, these materials being expensive and not particularly abundant.

Also as shown in FIG. 2, the preferred embodiment of the scanner unit has two mirrors set at preselected folding angles to one another. The first is the scanning mirror 8 which folds the optical axis between the input and output optical axes of the scanner, which axes can be defined as the respective Z and Y casrtesian coordinate axes of the FLIR. The and the second is a fixed mirror 25B that folds the optic axis at the scanner output, where the light remains collimated, directing it normal to both the input and output optical axes of the scanner mirror or along the X coordiate axis of FLIR. This folding of the optics into a more compact package adds another degree of adjustment to the environment in which the FLIR is used. The L-shaped elbow housing 24 slips snugly over a cylindrical pedestal 18A on the housing 18 of the detector-dewar assembly (SADA II). The optical axis of the housing is thus firmly aligned with the center of the detector array, the focal plane is aligned parallel with the plane of the detector array and the image can be rotated with respect to the array within the constraints set by the mounting environment. Rubber O-rings, set screws or clamping bands (not shown) may be added to,prevent relative movement and seal out contaminants, if needed.

The entire NV-80 FLIR kit consists of the afocal lens assembly, the L-shaped imaging optics, the scanner unit, the SADA II dewar unit, a one watt Sterling cycle cooler 26 and, in some cases two or three mounting adapters. Image processing and control circuit cards can be mounted to the kit, as desired. Besides the mechanical coupling described above, the dewar, cooler, scanner and afocal assembly are electrically coupled through leads 20A, 25A, 18B and 26A to a con, non Gable or harness (not shown) which in turn is coupled to the power supply of the vehicle involved. Plugs and sockets may be used at the ends of the leads and/or harness to facilitate packing and shipping the kit, but the kit is otherwise complete and ready to operate as shipped.

The electro-mechanical cooler 26 is connected to the dewar by a flexible pressure resistant coolant conduit 26B. Detachable couplings, similar to Schraeder valves, might be designed to make these units separable, but the low density cryogenic fluid used, e.g. helium, makes it preferable to use permanent connections. This further makes it desirable to provide a bracket 26C on the cooler with mounting holes and screws 26D aligned with the holes on the base of the dewar. The holes in either can be threaded or a nut or other fastener used to retain a pin or screw in each pair of holes. Thus only the dewar unit and the afocal assembly need a separate mounting adapters in the vehicle or system requiring the FLIR. If there is a vertical space limitation, however, the cooler can be removed and mounted on a larger version of the same adapter or on a separate adapter. In special cases some angular adjustment of the afocal and/or dewar assemblies can be provided to improve the fit or to improve viewing. A preferred method is to move the afocal platform so that the optical exit axis of the afocal always intersects the center of the scanner mirror axis and remains normal to this axis.

Figure 3:
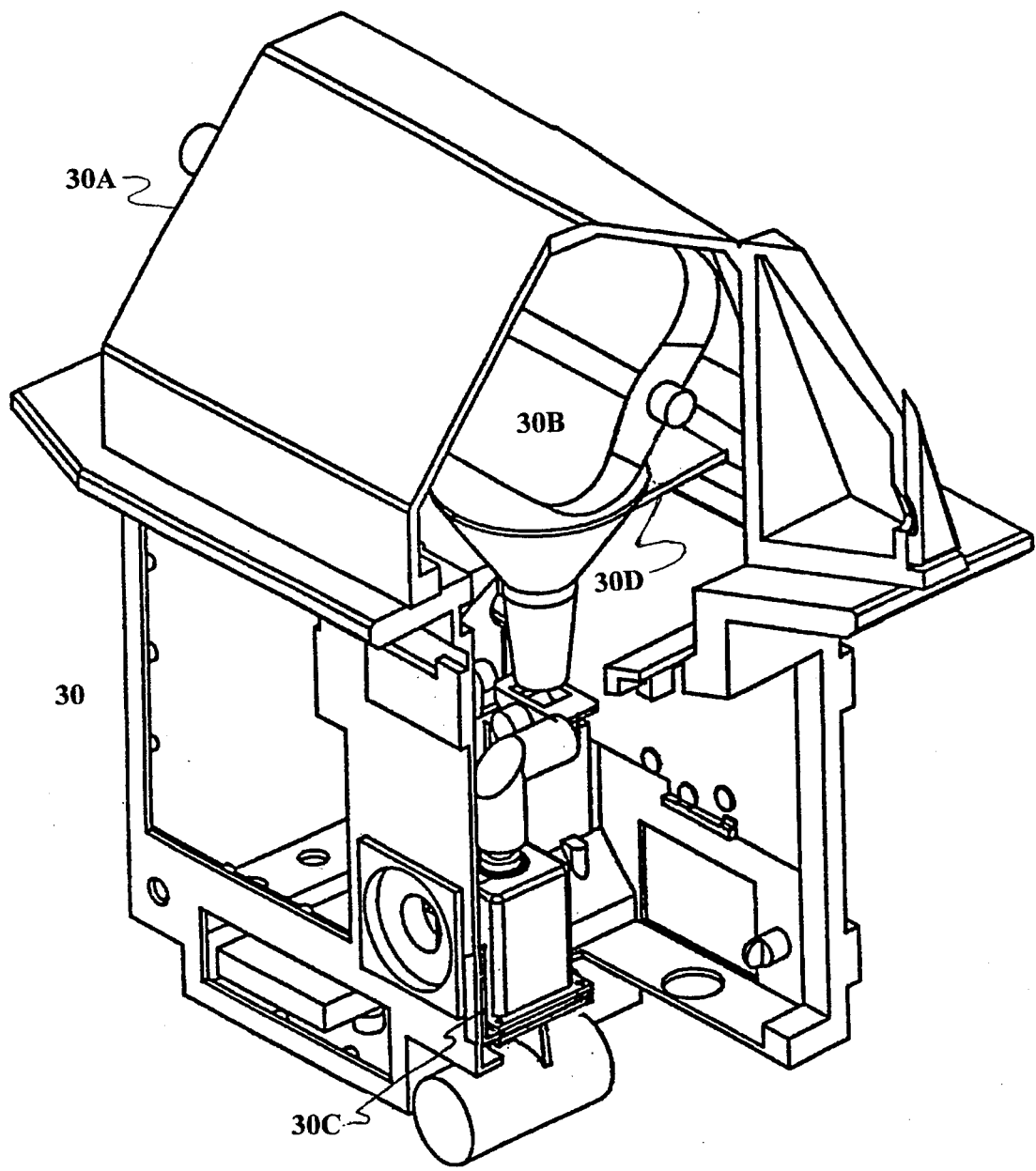
FIG. 3 shows the kit mounted in the Gunner's Primary Sight (GPS) in an M1 Bradley tank.

FIG. 3 shows an NV-80 kit mounted in an M1 Bradley tank using the sight platform 30 provided for the Gunner's Primary Sight. The platform is a generally rectangular chamber that opens into an external nacelle 30A containing a head mirror 30B. Near the bottom of the chamber an L-shaped metal shelf 30C is placed where the dewar unit is to be mounted. The vertical portion of the shelf is removeably attached or welded to the platform, while the horizontal portion has holes that match the corner holes in the baseplate of the dewar unit. As explained, the cooler is held on by screws or pins that pass through the baseplate and the cooler's mounting bracket. These screws are removed allowing the cooler to be placed below the shelf and the screws reinserted through both the baseplate and shelf into the cooler bracket. Thermal insulation, e.g. glass cloth or foamed plastic, is preferably placed between the bracket and the shelf to prevent heat transfer to the dewar. The afocal assembly is rigidly mounted above the scanner unit facing the head mirror by means of an adaptor plate 30D, for example, extending from the mounting flange on the afocal module over the upper flange on the top of the sight housing.

TABLE II

| | | | | | | |
|---|---|---|---|---|---|---|
| | LENS DATA NV-80 narrow FOV B-Kit | | | | | |
| Element | Radius of Curvature | | Axial Dist. to | Aperture | | Lens |
| No. | Front | Back | Next Surf. | Front | Back | Glass |
| Object | Infinity | | Infinity | | | |
| | | | | 5.5175 | | |
| | | | 0.5000 | | | |
| | | | Ap. Stop | | 5.5000 | |
| 71 | A(1) | 8.6157 cc | 0.5130 | 5.5000 | 5.3515 | Ge |
| | | | 1.5127 | | | |
| | | | | | 3.8610 | |
| | | | 0.0421 | | | |

TABLE II-continued

LENS DATA NV-80 narrow FOV B-Kit

| | | | | | | |
|---|---|---|---|---|---|---|
| | | | | | 3.7232 | |
| | | | 1.5866 | | | |
| 72 | 4.1874 cx | 2.1618 cc | 0.3800 | 1.6471 | 1.3459 | ZnSe |
| | | | 0.6995 | | | |
| | | | | | 0.7509 | |
| | | | 0.0594 | | | |
| | | | | | 0.7196 | |
| | | | 0.6116 | | | |
| | | | | | 0.2474 | |
| | | | 0.6246 | | | |
| 73 | −1.0410 cc | −0.9629 cx | 0.1650 | 0.7784 | 0.8910 | Ge |
| | | | 0.0440 | | | |
| 74 | 5.7453 cx | 2.2900 cc | 0.1300 | 0.9515 | 0.9588 | ZnSe |
| | | | 0.0838 | | | |
| 75 | 2.1801 cx | 6.1181 cc | 0.1800 | 1.0438 | 1.0087 | Ge |
| | | | 0.9484 | | | |
| | | | Decenter (1) | | | |
| 76 | | Infinite | 1.3711 | | 1.2481 | REFL |
| | | | Decenter (2) | | | |
| 77 | | Infinite | 0.3000 | | 1.1426 | Reflr. |
| | | | | | 1.1584 | |
| | | | 0.1601 | | | |
| 78 | 2.3987 cx | 2.9705 cc | 0.3632 | 1.2205 | 1.1099 | Ge |
| | | | 0.0349 | | | |
| 79 | | A(2) | 0.3619 | 1.0926 | 0.8652 | Ge |
| | 1.3495 cx | | 1.5748 | | | |
| | | | Decenter (3) | | | |
| 80 | | Infinite | −0.7361 | | 1.4060 | Reflr. |
| 81 | A(3) | 1.9092 cx | −0.4381 | 1.0808 | 1.3215 | Ge |
| | | | −0.0651 | | | |
| 82 | −4.2042 cx | −12.5128 cc | −0.2366 | 1.3706 | 1.3317 | Ge |
| | | | −0.0063 | | | |
| 83 | −1.1520 cx | A(4) | −0.4469 | 1.2496 | 0.8535 | Ge |
| | | | −0.3533 | | | |
| 84 | Infinite | Infinite | 0.0501 | 0.5496 | 0.5384 | Ge |
| | | | 0.3808 | | | |
| | | | | | 0.3808 | |
| | | | −0.0394 | | | |
| 85 | Infinite | Infinite | 0.0250 | 0.3861 | 0.3870 | Ge |
| | | | 0.7880 | | | |
| | | | | | 0.0934 | |
| 86 | | | 0.0000 | | | |
| | | | | | 0.0934 | |
| Image | IMAGE DISTANCE = Infinite | | 0.0000 | | 0.0934 | |

ASPHERIC CONSTANTS

| ASPHERIC | CURV | K | A | B | C | D |
|---|---|---|---|---|---|---|
| A(1) | 0.17882914 | −0.131206 | 0.00000E+00 | 0.00000E+00 | 0.00000E+00 | 0.00000E+00 |
| A(2) | 0.81063040 | 0.000000 | 2.27761E−02 | 5.74201E−03 | 1.63065E−02 | 0.00000E+00 |
| A(3) | 0.54363022 | 0.000000 | 0.00000E+00 | 3.64392E−03 | 0.00000E+00 | 0.00000E+00 |
| A(4) | −1.11586536 | 0.000000 | −1.32136F−02 | −7.54790E−03 | 0.00000E+00 | 0.00000E−00 |

DECENTERING CONSTANTS

| DECENTER | X | Y | Z | ALPHA | GAMMA | |
|---|---|---|---|---|---|---|
| D(1) | 0.0000 | 0.0000 | 0.0000 | 45.0000 | 0.0000 | (BEND) |
| D(2) | 0.0000 | 0.0000 | 0.0000 | 0.0000 | 0.0000 | (BEND) |
| D(3) | 0.0000 | 0.0000 | 0.0000 | 45.0000 | 0.0000 | (BEND) |
| | | | | BETA | | |
| | | | | 0.0000 | | |
| | | | | 45.0000 | | |
| | | | | 0.0000 | | |

REFERENCE WAVELENGTH = 10000.0 NM
SPECTRAL REGION = 8000.0–10000.0 NM

INFINITE CONJUGANTS

EFL = −13.9009
BFL = −0.0101

TABLE II-continued

LENS DATA NV-80 narrow FOV B-Kit

| | |
|---|---|
| FFL = | −209.8231 |
| F/NO = | 2.5274 |
| IMAGE DIST = | 0.0000 |
| OAL = | 6.0498 |
| PARAXIAL IMAGE HT = | 0.2426 |
| SEMI-FIELD ANGLE = | 1.0000 |
| ENTR PUPEL DIAMETER = | 5.5000 |
| DISTANCE = | 0.5000 |
| EXIT PUPEL DIAMETER = | 0.3635 |
| DISTANCE = | 0.9086 |

See general notes in Table I for explanations of data in Table II.

Figure 4:
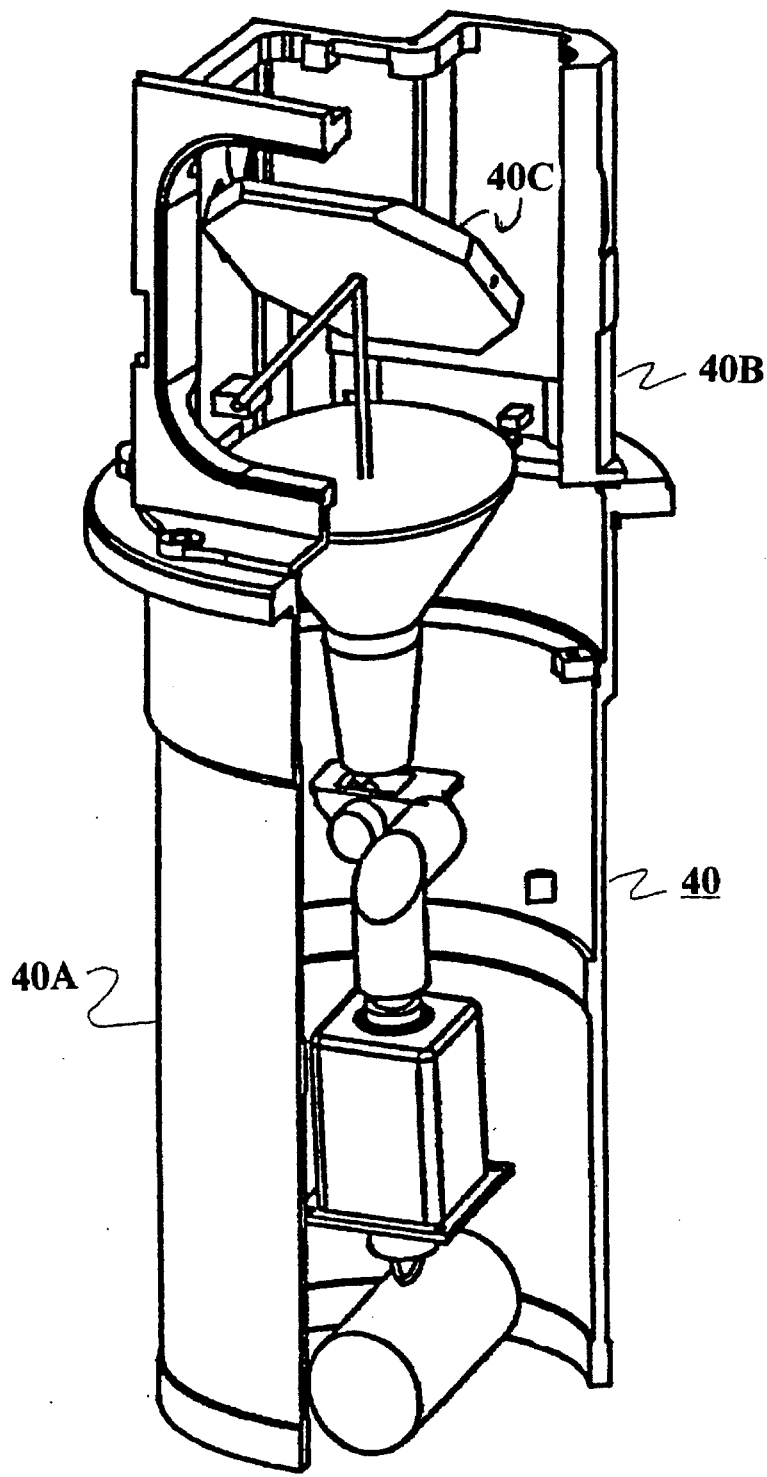
FIG. 4 shows the kit mounted in the Commanders Independent Thermal Viewer (CITV) in an M! Abrams tank.

FIG. 4 shows the same kit mounted in an Abrams tank on the platform provided for the Commander's Independent Thermal Viewer (CITV). This platform 40 is a generally cylindrical chamber 40A topped by a small nacelle 40B containing a small head mirror 40C. The dewar unit is mounted off center near the bottom of CITV chamber on a thermally insulated shelf as in FIG. 3, but adapted to the cylindrical wall. The afocal assembly is again mounted above the scanner facing the head mirror by a mounting plate that engages the mounting flanges at the top of the cylindrical chamber.

Figure 5:
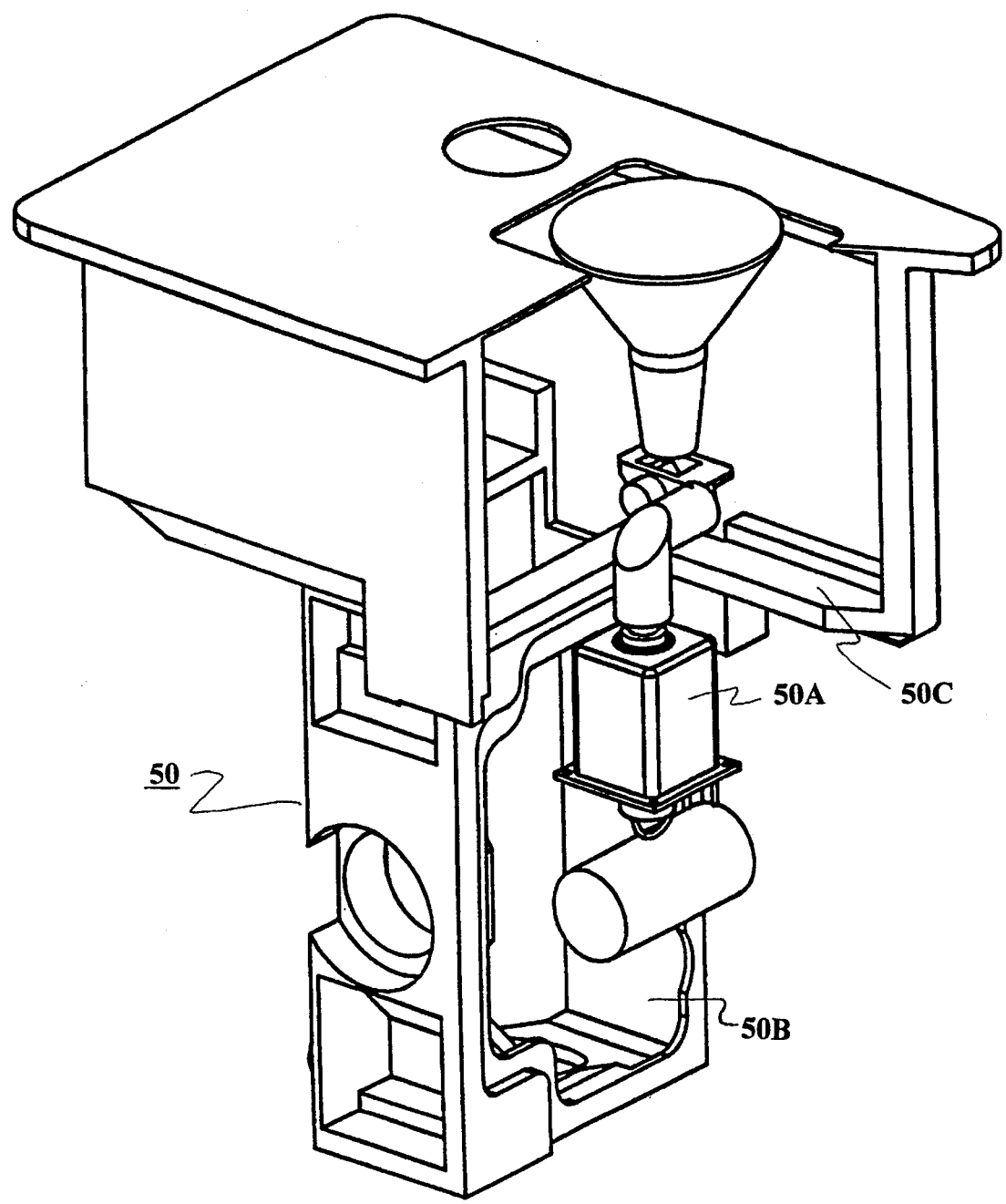
FIG. 5 shows the kit mounted in the Integrated Sight Unit (ISU) of the M1 Bradley tank.

FIG. 5 shows the same kit mounted in an M2 Bradley tank on a platform 50 provided for an Integrated Sight Unit (ISU). The arrangement here is similar to the FIG. 3 sight platform with a dewar 50A mounted on a shelf 50B and the afocal mounted on an upper flange 50C.

Figure 6:
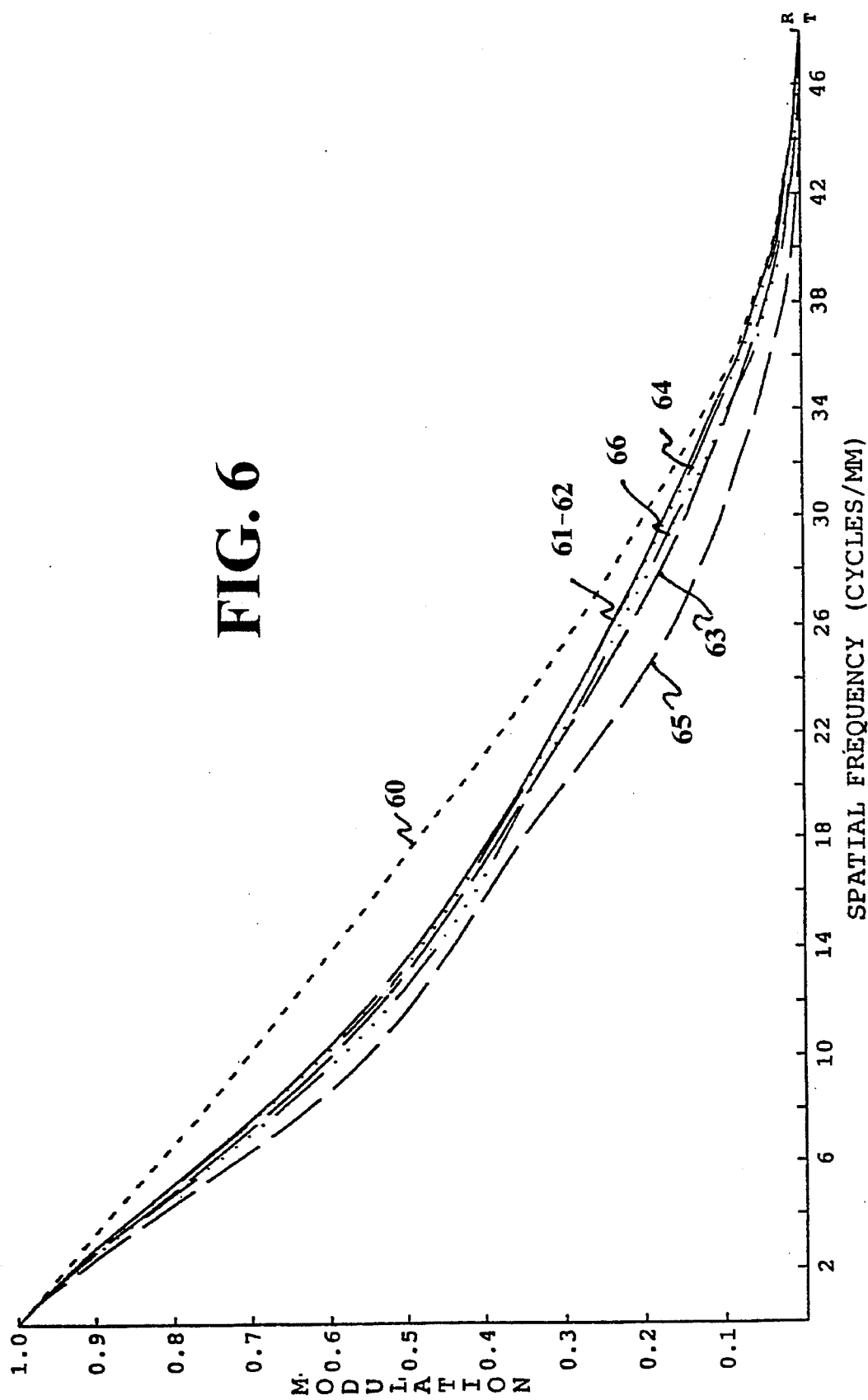
FIG. 6 shows a graph of the Modulation Transfer Functions for the wide field of view lens assembly of FIG. 1.

FIG. 6 shows the Modulation Transfer Function of the wide FOV FLIR optics shown in FIG. 1 at a wavelength of about 10 microns. The x and y components for 0.00°-curves 61 & 62, 1.80°-curves 63 & 64 and 3.74°-curves 65 & 66 follow one another closely and also closely approach the diffraction limited case.

Figure 7:
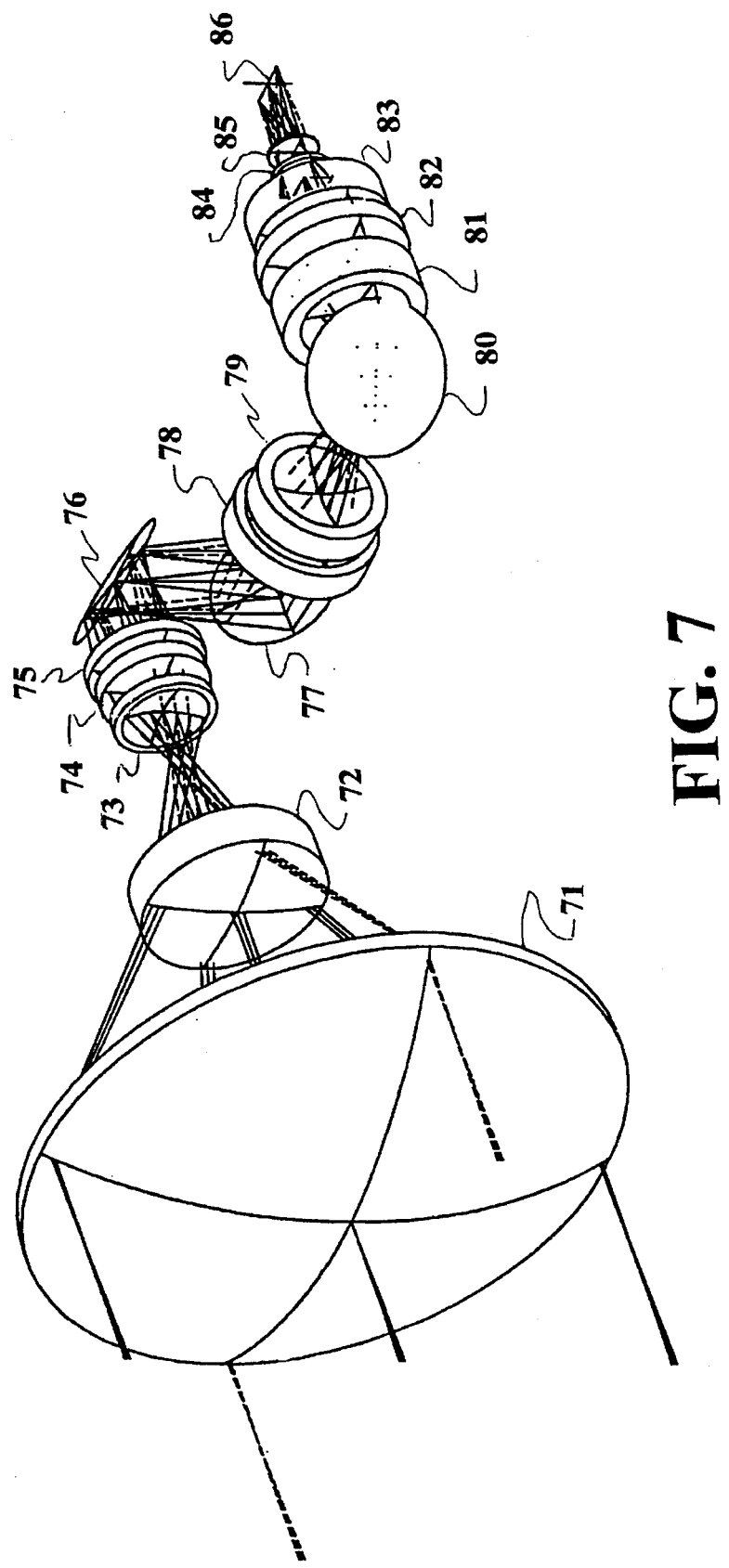
FIG. 7 shows a side view of the lens assembly in FIG. 1 converted to a narrow field of view and having a reflector added, to represent the true three dimensional aspect of the optical path.

FIG. 7 shows the narrow Field of View version of the system from FIG. 1. The folding mirror after the scanner is shown and demonstrates how to make the system more compact and easier to conform with a more limited space environment. The wide angle lenses 2 and 3 in FIG. 1 are omitted, but the remaining lenses are equivalent to lenses found in FIG. 1. Table II gives the Specification of the lens surfaces and spacings, if critical.

Figure 8:
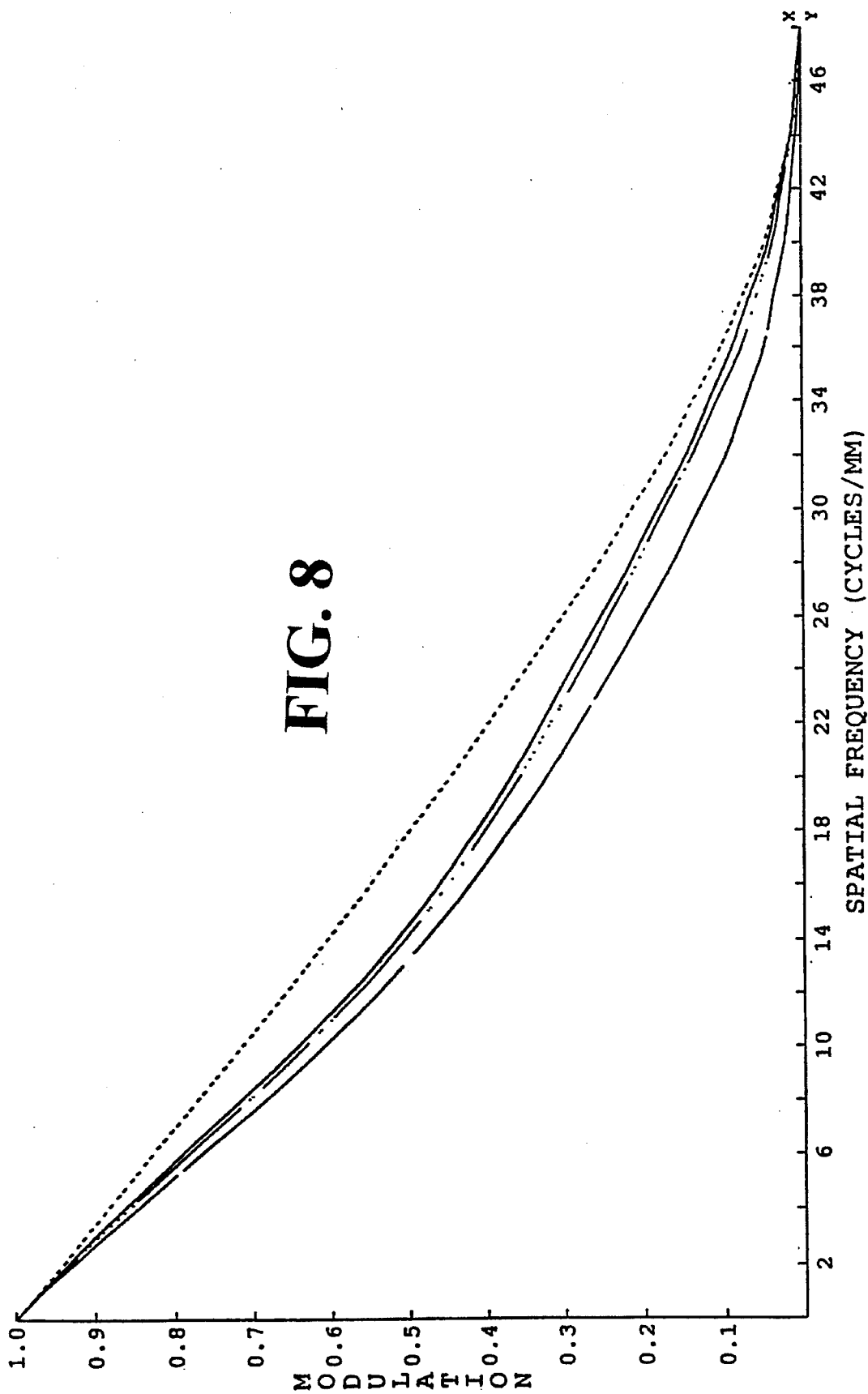
FIG. 8 shows a graph of the Modulation Transfer Function of the narrow field of view assembly in FIG. 7.

FIG. 8 shows the Modulation Transfer Functions of the FLIR optics shown in FIG. 7. Note I that these functions do not differ greatly from the wide FOV functions of FIG. 6.

While this invention has been described in terms of preferred embodiment consisting of a standardized kit, those skilled in the art will recognize that the invention can be practiced with modification within the spirit and scope of the appended claims.

Having thus described my invention, what I claim as new and desire to secure by Letters Patent is as follows:

1. A GEN II FLIR kit comprising:

a detector-dewar having a cylindrical pedestal on the top thereof, said pedestal having at least one flat window therein revealing an internal array of far-infrared photodiodes, and a tubular fitting at the bottom thereof for coolant gas;

a housing elbow including input and output straight tubular arms of uniform circular cross-section, having axes of symmetry as optical axes, said axes intersecting at a point to define a folded optical axis in said elbow;

a flat corner mirror defining a first reflection plane centered on said point with a normal thereto through said point lying in a second plane containing said folded optical axis, said normal bisecting the angle between said axes;

the walls of said arms terminating at input and output planes normal to their respective axes and extending from said point to define completely separated input and output open ends;

the opposite ends of said arms being joined at their intersection to form a combined arm with a minimum of wall;

the combined arm being joined to said corner mirror at said intersection;

said mirror also being minimized by termination at the intersection of said first reflection plane with said combined arm to complete said housing elbow;

said output open end engaging said pedestal;

a set of imaging lenses mounted along said folded optical axis in said output arm;

a set of decollimating lenses mounted along said folded optical axis in said input arm; and a motorized scanner module mounted over said input open end for rotatable adjustment about the axis of said input arm, whereby an optic axis projects into said scanner from said input arm;

said scanner module including a scanning mirror, centered on said optic axis and pivoted on an axis normal to said optic axis in said scanner module;

said scanning mirror being oriented to fold said optic axis substantially normal to said input arm axis over a full scan with 360° freedom of adjustment about said input arm axis.

2. A FLIR according to claim 1, further including:

a rigid mounting platform attached to said detector-dewar;

an afocal housing attached to said platform, said afocal housing including a cylindrical wall that tapers from a large diameter input aperture at one axial end to a small diameter output aperture at its opposite axial end, the symmetrical axis of said cylindrical wall defining an afocal segment of the folded optic axis;

at least two far infrared objective lens elements and three image collimating lens elements mounted along said afocal segment;

said afocal housing being positioned to project an image on the center of said scanning mirror normal to the axis of said input arm.

3. A FLIR according to claim 2, wherein:

said decollimating lenses include two lens elements and said imaging lenses include three lens elements.

4. A FLIR according to claim 3, wherein:

a plurality of said lens elements are made from one type of material and remaining lens elements are made from a material having a different index of refraction than said one type of material for far-infrared, to compensate for frequency dispersion.

5. A FLIR according to claim 4, wherein:

said lens elements include quarter wavelength anti-reflection coatings.

6. A FLIR according to claim 3, wherein:

one surface of a plurality of said lens elements of said afocal housing are aspheric to increase the useful aperture of these elements and thereby reduce their size and weight.

7. A FLIR according to claim 3, wherein said afocal housing further comprises:

two additional far infrared wide angle lens elements that are attached to a moveable auxiliary mounting structure for moving them between a position clear of the folded optic axis and a position coaxial with said folded optic axis to vary the field of view.

8. A FLIR according to claim 7, wherein:

said auxiliary mounting structure is also moveable parallel to said folded optic axis to focus the FLIR.

9. A FLIR according to claim 8, wherein:

all motions of said auxiliary mounting are motor controlled and wired to respond to a remote controller.

10. A FLIR according to claim 9, wherein:

the moveable wide angle elements are second and third lens elements along the folded optic axis, a fourth lens element which follows said wide angle elements in the folded optic axis is also attached to a motorized moveable mounting that is moveable parallel to the folded optic axis, and is controlled by said remote controller to focus the FLIR, regardless of the position of said wide angle lenses.

11. A FLIR according to claim 1, wherein:

said decollimating lenses include two lens elements and said imaging lenses include three lens elements.

12. A FLIR according to claim 1, wherein:

said motorized scanner module includes an additional mirror, said additional mirror being centered on the optic axis between said scanning mirror and said decollimating lenses thereby futher folding and compacting the FLIR assembly.

13. A FLIR according to claim 1, wherein:

the axes of said input and output arms of said housing elbow are normal to one another.

\* \* \* \* \*